April 16, 1935.  J. A. HOEGGER  1,997,686
FIXTURE SUPPORT
Filed June 13, 1933
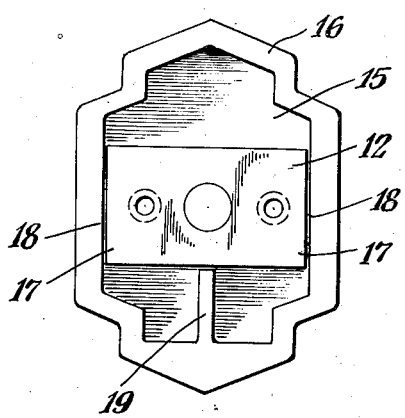
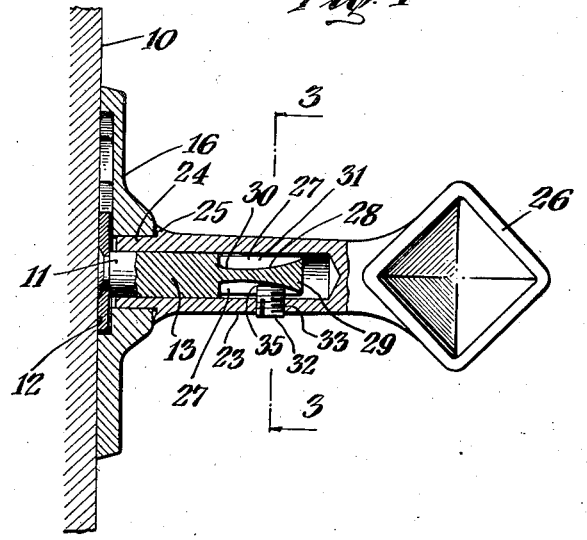
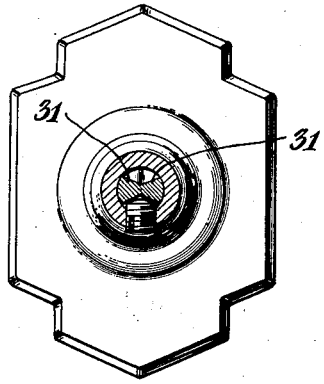
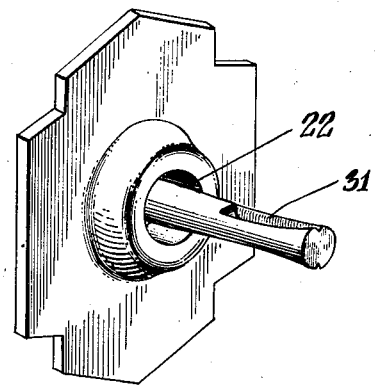
INVENTOR
Joseph A. Hoegger
BY
ATTORNEYS Patented Apr. 16, 1935

1,997,686

UNITED STATES PATENT OFFICE 1,997,686

FIXTURE SUPPORT

Joseph A. Hoegger, North Bergen, N. J.

Application June 13, 1933, Serial No. 675,521

1 Claim. (Cl. 248—20)

My invention relates generally to fixture supports and more particularly to a fixture support having a supporting member attached to a supporting surface and a supported member fitting over the supported member and which is formed in two parts comprising a wall flange and a shank.

Previously fixture supports have been made in one piece but these have the disadvantage of being expensive to produce due to their relatively complex form and require considerable forming and machining operations. Also difficulties have been experienced in satisfactorily plating such one piece fixtures, particularly when using electrolytes of poor throwing power such as is the case in chromium plating. Further, it has previously been necessary for a dealer in such fixtures to keep on hand a considerable stock to supply the trade with all of the forms of fixtures desired and this has necessitated a considerable outlay of capital in many cases.

One of the objects of my invention is to overcome and avoid these disadvantages. Other objects and advantages become apparent from the following description.

My fixture support consists in a supporting member having a projecting stem with beveled surfaces adapted to act with a screw to cause a drawing action of the supported member which will later be described in detail and also simultaneously a rotating action of the supported member which brings it into proper alignment and position. The supported member consists of two parts. One part is a wall flange which fits over the supporting member and which is preferably centered by cooperating embossments and recesses and which also permits the stem of the supporting member to extend through the plane of its surface. The second part of the supported member consists of a shank with a recessed end adapted to fit over the projecting stem of the supporting member and which is also formed at its inner end to fit snugly into or against the wall flange of the supported member. This shank preferably has in it a set screw which upon tightening is adapted to bear against the beveled recesses in the stem of the supporting member and, if necessary, to move along the surface of this beveled portion, whereby the shank is drawn or forced against the wall flange, which in turn is forced snugly and securely against the wall, and whereby, also, the shank is rotated about the stem until the set screw is seated at a recessed point which has been so arranged as to position the shank in the desired operable position. The outer end of this shank may consist of the desired fixture or, for example, may carry a form such as a lighting fixture.

My structure has several outstanding advantages. For example, the cost of manufacturing has been considerably decreased as my wall flanges are readily stamped or formed by drop forging and the shanks also readily formed by drop forging or casting with a minimum amount of machining operation. Also the wall flange can be made in standard design and can be formed to coact with a variety of different shanks for fixtures or fixture supports. For example, one type of wall flange can be used to coact with a shank for a towel bar, a soap dish, a tooth brush holder or a lighting fixture or even various designs of these shanks. As a result, a dealer need carry only one type of wall flange in stock and yet with my device, it is possible to supply a variety of forms of fixtures.

One of the more important advantages, however, of my structure is the ease and positiveness of assembly of such a three part structure. All that is necessary is to affix securely a supporting wall plate and stem to a wall or other supporting surface, then slip the supported wall flange over the stem and on to the aligning embossments and recesses, then place the shank of the fixture over the extending stem and tighten the set screw in the shank. This operation forces the shank along the stem towards the wall and simultaneously rotates it circumferentially to the desired position. By this tightening operation a firm, snug, non-rattling positioning is given to the supported members. It will also be noticed that the increased simplicity of the parts of my device permit a more satisfactory and more easily carried out plating operation, particularly when using a chromium electrolyte. Also when the parts are set in operable position they give the appearance of a single piece structure.

Further features of the invention reside in the construction, arrangement and combination of parts, which together with other features will become more apparent to persons skilled in the art as the specification proceeds, and upon reference to the drawing, in which:

Figure 1 is an elevation partly in section of an embodiment of the invention for the purposes of illustration.

Figure 2 is a rear view.

Figure 3 is a view on line 3—3 of Figure 1; and,

Figure 4 is a perspective view of the fixture support with the shank removed.

Referring now more particularly to the drawing, at 10 is shown a supporting surface which may be of any character such as a wall, ceiling, etc. At 11 is shown the supporting member, which is illustrated as comprising a wall plate 12 and a grooved stem 13. The wall plate 12, as seen in Figure 2, is of rectangular contour and fits within a recess 15 in the rear of wall flange 16 in a manner so that the wall flange 16 will be properly oriented with respect, to the wall plate 12. In this particular instance, it is desired that the longer dimension of the wall flange 16 be vertical. For this purpose the ends 17 of wall plate 12 are made closely contiguous to the sides 18 of recess 15, and a rib 19 having an end closely contiguous to a side edge of wall plate 12 is provided to prevent the wall plate 12 from entering the recess 15 in any other manner than that shown.

Other arrangements may be provided to insure the proper orientation of the wall flange 16.

Wall flange 16 is provided with an aperture 22 at its center. Shank 23 fits over the stem 13 and has an end 24 which fits in the aperture 22. A shoulder 25 is provided on shank 23 for holding wall flange 16 in place. End 26 of shank 23 is adapted to engage or support a fixture or other article and may be of any desired character, shape or form.

To hold the wall flange and shank in position and to quickly and conveniently orient the shank 23 with respect to the supporting member 10 and wall flange 16, a combination of sloping surface components and cooperating engaging means are employed.

The stem 13 is shown provided with diametrically opposed longitudinally arranged slots or grooves 27 for convenience. This arrangement permits the shank 23 to be fastened in either of two positions. However, only one slot 27 is required.

Slot 27 is of a compound character. It has a surface component 28 which slopes longitudinally and inwardly of the slot 27 from adjacent the periphery of the end 29 to an intermediate point 30 and two opposed surface components 31 which slope laterally and converge inwardly from opposite longitudinal peripheral edges of the slot 27 toward the bottom of the slot. In other words the slot 27 has inwardly sloping side walls with longitudinal edges at the periphery of stem 13 which diverge from end 29 to point 30. This may also be expressed by saying that the angle between the two side walls increases from end 29 to point 30. It is understood, however, that the side walls need not be plane surfaces. Slots 27 may be formed by any suitable tool.

With this arrangement the fastening member, which is shown as a screw 32 threaded in a tapped hole 33 in the wall of the shank 23, engages the surface components 28 and 30. Because of the sloping surface component 28 the shank 23 is forced toward the surface 10 and against the wall flange 16, which in turn is forced and securely held against the surface 10 when screw 32 is tightened. Since the screw 32 at its end 35 is somewhat narrower than the width of the slot 27 at the periphery of the stem 13, end 35 will enter groove 27 even though the shank 23 is not in its correct position circumferentially of the stem 13. The laterally sloping surface components 31 are arranged so that as the fastening member 32 is tightened the shank 23 will be turned to its proper position and will be securely held in such position upon the tightening of said screw.

As a result no time is lost in attaching and securing the shank 23 in place because the device is self orienting. Considerable time is saved in attaching the supported member and it is unnecessary to employ skilled labor for this purpose.

It should be noted that the screw 32 is the only securing device visible and that shank 23 may be turned so that it will be hidden from view.

Although the invention has been described in connection with a wall plate and stem it is obvious that another member or members may be substituted. When the supported member is integral the compound surface and the surface engaging element may also be employed to orient the wall flange, in which case the arrangement at 15, 17, 18 and 19 at the back of the wall flange 16 becomes unnecessary. End 24 and aperture 22 might be given a geometrical shape other than circular for this purpose.

While the compound surface has been described as being on the stem 13 and the surface engaging element as being on the end of fastening member 32, the surfaces of the two might be interchanged. It will be understood that fastening member 32 may be of any other character and that its end 35 need not turn in the slot 27 for proper functioning of the securing means.

The wall flange and shank when separate can be made at a much lower cost without a sacrifice in quality. Many new shapes are made available because of the latitude afforded in the manufacturing steps. The plating process is greatly simplified with a substantial improvement in uniformity of results.

Having described my invention it is obvious that many changes, omissions, additions, substitutions and modifications may be made in the same within the scope of the claim without departing from the spirit thereof.

I claim:

A fixture support comprising a supporting member having a stem, said stem having a relatively shallow elongated recess formed therein, said recess extending longitudinally of said stem and being of appreciable length and having a surface component that slopes longitudinally inwardly toward said supporting member and a surface component that slopes laterally inwardly with respect to the bottom of said recess, a supported member having a shank that fits over said stem, and an adjustable fastening member carried by said shank, said fastening member having a slightly rounded bearing surface substantially equal in diameter to the lateral dimensions of said recess and adapted to impinge on said surface components as bearing surfaces to provide a drawing effect to move said shank longitudinally of said stem and to rotate said shank sufficiently to orient the same circumferentially of said stem.

JOSEPH A. HOEGGER.